C. E. LORD.
ROTOR CONSTRUCTION.
APPLICATION FILED JUNE 22, 1905.
902,588.
Patented Nov. 3, 1908.
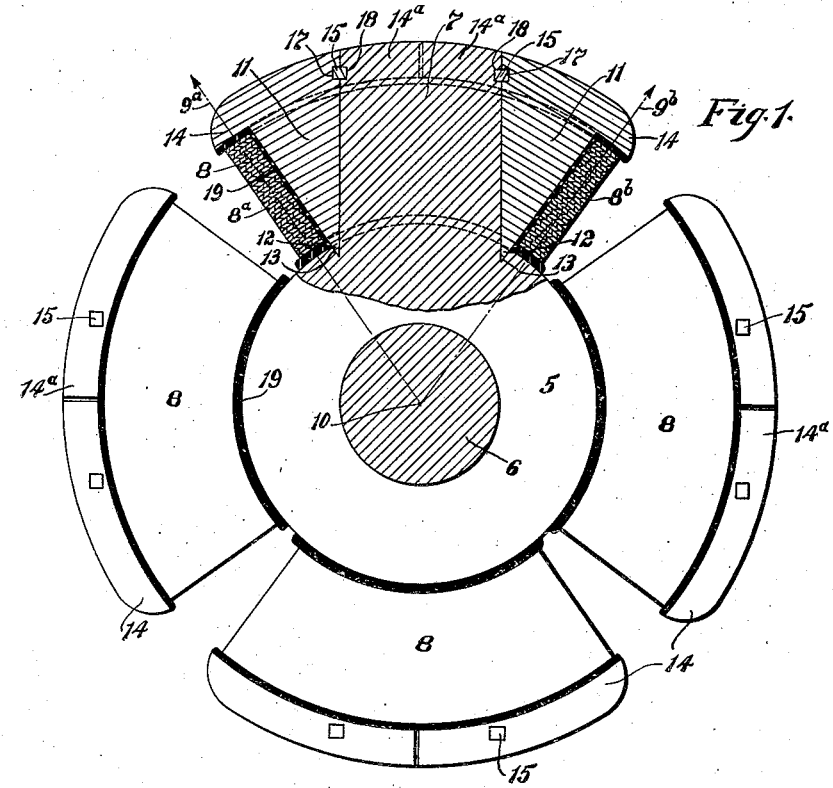
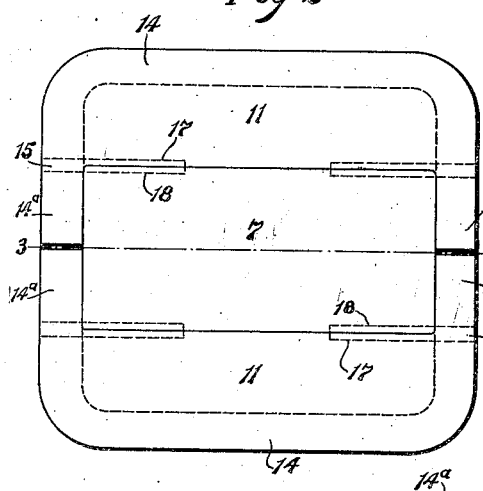
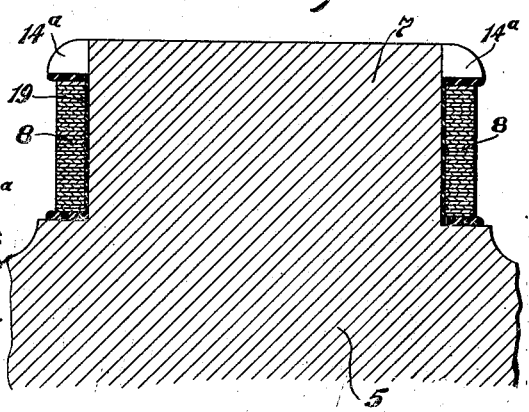
Witnesses:
George J. Schwartz.
Fred J. Kinsey
Inventor:
Chas. E. Lord

UNITED STATES PATENT OFFICE.

CHARLES E. LORD, OF NORWOOD, OHIO, ASSIGNOR TO THE BULLOCK ELECTRIC MANUFACTURING COMPANY, A CORPORATION OF OHIO.

ROTOR CONSTRUCTION.

No. 902,588.  Specification of Letters Patent.  Patented Nov. 3, 1908.

Application filed June 22, 1905. Serial No. 266,524.

*To all whom it may concern:*

Be it known that I, CHARLES E. LORD, a citizen of the United States, residing at Norwood, in the county of Hamilton and State of Ohio, have invented certain new and useful Improvements in Rotor Constructions, of which the following is a full, clear, and exact specification.

My present invention relates to improvements in the construction and arrangement of the rotor or rotatable element of dynamo-electric machines.

In high speed dynamo-electric machines, such as turbo-generators employing a stationary armature and a rotating field structure, considerable difficulty has been experienced in properly securing the pole pieces and windings of the rotatable element against displacement and damage due to the enormous centrifugal forces acting upon them at very high speeds.

The object of my invention is to overcome the difficulties above enumerated and to produce a simple and effective rotor construction in which there will be little or no tendency for the centrifugal and other forces to displace the pole-pieces or the windings thereon.

In carrying out my invention I construct the rotatable element of a dynamo-electric machine with a shaft or hub having pole-pieces formed integral therewith, coils, preferably wedge-shaped, surrounding said pole-pieces, and means for holding said coils in position on said pole-pieces.

The invention further consists of novel details and combinations of parts which will be hereinafter described and more particularly pointed out in the appended claims.

In the accompanying drawings, which illustrate the preferred embodiment of my invention, Figure 1 is an end elevation partially in section of my improved rotatable element; Fig. 2 is a plan view of one of the assembled pole-pieces; Fig. 3 is a section through the pole-piece and coil on the line 3—3 of Fig. 2; and Fig. 4 is a detail view of one of the wedge-shaped holding pieces.

Referring now to the drawings, in which only the rotatable element of the dynamo-electric machine is shown, 5 indicates the hub, preferably formed integral with the shaft 6 and having the pole-pieces or pole-piece portions 7 integral therewith and projecting radially therefrom. As here shown the hub 5 can be considered merely an enlargement of shaft 6, but may be formed as a separate member, if desired. Surrounding each of said pole-pieces or pole-piece portions 7 is a wedge-shaped coil 8. This coil is preferably previously formed of a strip of conducting material edgewise wound in such a manner that when placed in position on the pole-piece (as shown in Fig. 1) the center lines of its sides $8^a$ and $8^b$ will be in alinement with the radii $9^a$ and $9^b$ drawn perpendicular to the axis 10 of the rotatable member. The layers or turns of said coil are preferably so arranged that they will be at right angles to said radii. With this arrangement the centrifugal forces acting along the radial lines $9^a$ and $9^b$ in the directions indicated by the arrow heads will tend to hold the coil in its proper position rather than to displace and distort same. The pole-piece or pole-piece portion 7 is preferably made a little smaller than the inner end of the formed coil 8 so that said coil may be slipped readily into position over said pole-piece. To hold the coil firmly in place I provide the wedge-shaped holding pieces 11 which are forced into position (as shown in Fig. 1) between the integral portion 7 of the pole-piece and the coil 8, the apex 12 of each wedge-shaped piece entering a longitudinal groove 13 formed in the hub 5. Each wedge-shaped piece 11 is provided with the overhanging flanges 14 and $14^a$ against which the outer end of the coil 8 rests. The pieces 11 are held in place by the keys 15 which pass through the openings 16 in the flanges 14 and enter the slots 17 and 18 formed in the removable pieces 11 and the integral pieces 7 respectively. Said pieces 11 may, if desired, be made of non-magnetic material, but are preferably of the same magnetic material from which the hub and pole-pieces 7 are made. A spool 19 of insulating material is located between the coil 8 and the integral and separate portions of the pole-piece.

When the rotatable member is rotated at high speed the centrifugal forces acting upon the sides of coil 8 force same against the flanges 14, and the wedge-shaped pieces 11 tend to turn about the key 15 as an axis. Such a turning movement is prevented by the co-action of the apexes 12 with the sides of grooves 13 and also by the forces acting radially against the flanges $14^a$ which engage the parallel sides of the coils 8. In assembling my improved rotatable member, the formed coil 8 is slipped into position over the pole-piece portion 7, then the wedge-shaped pieces 11 are forced into position and finally the keys 15 are driven into the members 7 and 11.

In the appended claims I aim to cover all modifications of my invention which do not involve a departure from its spirit and scope.

Having thus described my invention, what I claim as new and desire to secure by Letters Patent is—

1. In the rotatable element of a dynamo-electric machine, a hub, a pole-piece formed integral with said hub, a wedge-shaped coil surrounding said pole-piece and having the center lines of its sides radial with respect to the axis of the rotatable element, and removable wedge-shaped pieces between the pole-piece and the sides of the coil.

2. In the rotatable element of a dynamo-electric machine, a hub, a pole-piece formed integral with said hub, a wedge-shaped coil surrounding said pole-piece and having center lines of its sides radial with respect to the axis of the rotatable element, removable wedge-shaped pieces between the pole-piece and the sides of the coil, said wedge-shaped pieces having over-hanging flanges engaging the outer end of said coil, and means for holding said wedge-shaped pieces in position on said pole-piece.

3. In the rotatable element of a dynamo-electric machine, a hub, a pole-piece formed integral with said hub, a wedge-shaped coil surrounding said pole-piece and having the center lines of its sides radial with respect to the axis of the rotatable element, removable wedge-shaped pieces between the pole-piece and the sides of the coil, said wedge-shaped pieces having over-hanging flanges engaging the outer end of said coil, said hub being provided with grooves into which the apexes of said wedge-shaped pieces project, and keys between the integral pole-piece and said wedge-shaped pieces.

4. In the rotatable element of a dynamo-electric machine, a hub, a pole-piece formed integral with said hub, a wedge-shaped coil surrounding said pole-piece and having the center lines of its sides radial with respect to the axis of the rotatable element, said coil being formed of an edgewise wound strip of conducting material in such a manner that when in position on said pole-piece the several turns of said coil will be perpendicular to radii at right angles to said axis, the formed coil being adapted to be slipped bodily over the end of said integral pole, and readily removable means located between the coil and the integral pole-piece for holding said coil in position on said pole.

5. In the rotatable element of a dynamo-electric machine, a hub, a pole-piece formed integral with said hub, wedge-shaped members removably attached to said integral pole-piece, and a wedge-shaped coil surrounding said pole-piece and having the center lines of its sides radial with respect to the axis of the rotatable member, said wedge-shaped members being located between the radial sides of the coil and the integral pole-piece.

6. In a rotatable element of a dynamo-electric machine, a rotatable member comprising a hub or core, a pole piece carried by said hub or core, said pole piece comprising a member having its opposite sides substantially parallel, a coil having two opposite sides parallel and two sides inclined, said inclined sides having center lines substantially radial, and members 11 located between the pole-piece and the inclined sides of said coil.

7. In a rotatable element of a dynamo-electric machine, a rotatable member comprising a hub or core, a pole piece carried by said hub or core, said pole piece having its opposite sides substantially parallel, a coil having two opposite sides parallel and two sides inclined, said inclined sides having center lines substantially radial, and two coil retaining members secured to said pole-piece between the sides of the latter and the inclined sides of the coil.

In testimony whereof I affix my signature, in the presence of two witnesses.

CHARLES E. LORD.

Witnesses:
L. LOWENBERG,
FRED J. KINSEY.